United States Patent [19]

Kubota et al.

[11] Patent Number: 4,819,113
[45] Date of Patent: * Apr. 4, 1989

[54] MAGNETIC TRANSDUCER HEAD WITH INCLINED MAGNETIC GAP

[75] Inventors: Makoto Kubota; Tatsuo Kumura; Junichi Saito; Tomio Kobayashi; Heikichi Sato, all of Miyagi, Japan

[73] Assignee: Sony Corporation, Tokyo, Japan

[*] Notice: The portion of the term of this patent subsequent to Jul. 5, 2005 has been disclaimed.

[21] Appl. No.: 713,637

[22] Filed: Mar. 19, 1985

[30] Foreign Application Priority Data

Mar. 29, 1984 [JP] Japan .................. 59-61852
Jun. 18, 1984 [JP] Japan .................. 59-124805
Jan. 26, 1985 [JP] Japan .................. 60-13132

[51] Int. Cl.$^4$ .................. G11B 5/187; G11B 5/147
[52] U.S. Cl. .................. 360/126; 360/122
[58] Field of Search .......... 360/119, 122, 125, 126, 360/120, 121; 29/603

[56] References Cited

U.S. PATENT DOCUMENTS 4,182,643  1/1980  Calderon, Jr. et al. ......... 360/120
4,392,167  7/1983  Joormann ................... 360/120
4,559,572 12/1985  Kumasaka et al. ........... 360/119

FOREIGN PATENT DOCUMENTS 0125891 11/1984  European Pat. Off. ......... 360/122
3007175   9/1980  Fed. Rep. of Germany .
56-124112 9/1981  Japan .
56-121111 9/1981  Japan .
57-147122 9/1982  Japan .
58-175122 10/1983 Japan .
58-169318 10/1983 Japan .

Primary Examiner—Robert S. Tupper
Assistant Examiner—Melissa J. Koval
Attorney, Agent, or Firm—Hill, Van Santen, Steadman & Simpson

[57] ABSTRACT

A magnetic transducer head in which the magnetic core elements of ferromagnetic oxides are sliced obliquely across the junction surface of the core elements, ferromagnetic metal thin films are formed on the resulting inclined surfaces by employing a physical vapor deposition, and the core elements are placed with the respective ferromagnetic metal thin films abutting to each other for defining a magnetic gap therebetween, wherein the improvement consists in that said inclined surfaces with the ferromagnetic metal thin films formed thereon are inclined at a preset angle with the magnetic gap forming surface, in that non-magnetic films having high-hardness are interposed between the ferromagnetic oxide and the ferromagnetic metal thin films, and in that said ferromagnetic metal thin films and the oxide glass fillers are provided on the tape abutment surface by the intermediary of the non-magnetic film having high-hardness.

The provision of the non-magnetic film having high-hardness between the ferromagnetic oxide and the ferromagnetic metal thin film is effective to inhibit the reaction otherwise occurring between the oxide and the films, while positively preventing the formation of the boundary layer with inferior magnetic properties.

Likewise, the provision of the non-magnetic film having high-hardness between the ferromagnetic metal thin film and the oxide glass is effective to prevent the erosion of the film by the molten glass, while also improving the molten glass fluidity.

It should be noted that the non-magnetic films having high-hardness may be provided on the interface only between the core elements and the metal thin films or on the interface only between the metal thin films and the oxide glass.

58 Claims, 14 Drawing Sheets

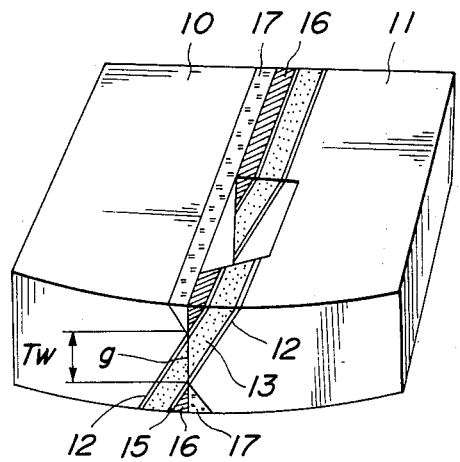
FIG.1
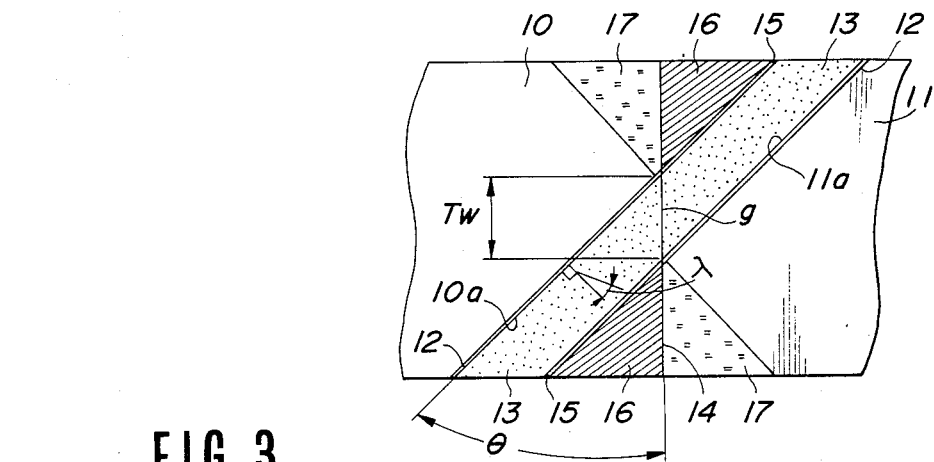
FIG.2
FIG.3
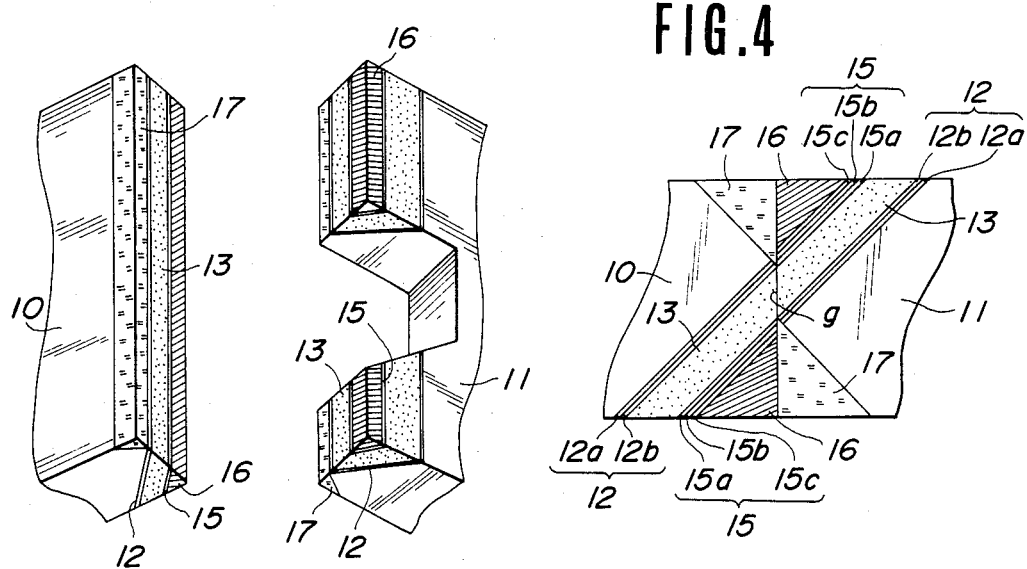
FIG.4

MAGNETIC TRANSDUCER HEAD WITH INCLINED MAGNETIC GAP

BACKGROUND OF THE INVENTION

1. Field of the Invention

This invention relates to a magnetic transducer head and more particularly to a so-called composite type magnetic transducer head in which head portion in the vicinity of the magnetic gap is formed by the ferromagnetic metal thin film or films.

2. Description of the Prior Art

With the recent tendency towards increasing the signal recording density on the magnetic tape used for VTRs (video tape recorders), so-called metal magnetic tapes in which powders of ferromagnetic metal such as Fe, Co or Ni are used as magnetic powders for the recording medium, or so-called metallized tapes in which the ferromagnetic metal material is deposited in vacuum on the base film, are used in increasing numbers. The magnetic material of the magnetic transducer head employed for signal recording and reproduction is required to have a high saturation magnetic flux density Bs in order to cope with the high coercive force Hc of the recording media described above. With the ferrite material predominantly used as the head material, the saturation magnetic flux density Bs is rather low, while the Permalloy presents a problem in that it has a lower wear resistance.

With the above described tendency towards increasing the signal recording density, it is more preferred to make use of the narrow track width of the magnetic recording medium and hence the magnetic transducer head is required to have a correspondingly narrow recording track width.

In order to meet such requirements, a composite type magnetic transducer head is known in the art in which the ferromagnetic metal thin film having high saturation flux density is applied on the non-magnetic substrate e.g. of ceramics so as to be used as the recording track portion of the magnetic tape. The magnetic transducer head however presents a high magnetic reluctance because the path of magnetic flux is formed only by the ferromagnetic metal film of a reduced film thickness so that the operating efficiency is correspondingly lowered. In addition, an extremely time consuming operation is involved in the manufacture of the magnetic transducer head because the physical vapor deposition with extremely low film-forming speed are necessarily employed for the formation of the ferromagnetic metal thin films.

A composite type magnetic transducer head is also known in the art in which the magnetic core elements are formed of ferromagnetic oxides such as ferrite and the ferromagnetic metal thin films are applied to the magnetic gap forming surface of these core elements. However, the path of magnetic flux and the metal thin film are disposed at right angles with each other and hence the reproduction output may be lowered due to the resulting eddy current loss. Also a pseudo gap is formed between the ferrite magnetic core and the metal thin film thus detracting from the operational reliability.

SUMMARY OF THE INVENTION

It is therefore a principal object of the present invention to overcome the above described deficiency of the prior art and to provide a composite type magnetic transducer head consisting of the ferromagnetic oxide and the ferromagnetic metal thin films, which is improved in molten glass fluidity, bonding properties and relaxation in the internal stress, and which is free from deterioration in the ferromagnetic metal thin film or ferromagnetic oxides, crack, breakage, erosion or bubbles in the glass fillers.

With the foregoing object in view, the present invention resides in a magnetic transducer head in which the magnetic core elements of ferromagnetic oxides are sliced obliquely across the junction surface of the core elements, ferromagnetic metal thin films are formed on the resulting inclined surfaces by employing a physical vapor deposition, and the core elements are placed with the respective ferromagnetic metal thin films abutting to each other for defining a magnetic gap therebetween, wherein the improvement consists in that said inclined surfaces with the ferromagnetic metal thin films formed thereon are inclined at a preset angle with the magnetic gap forming surface, in that non-magnetic films having high-hardness are interposed between the ferromagnetic oxide and the ferromagnetic metal thin films, and in that said ferromagnetic metal thin films and the oxide glass fillers and provided on the tape abutment surface by the intermediary of the non-magnetic film having high-hardness.

The provision of the non-magnetic film having high-hardness between the ferromagnetic oxide and the ferromagnetic metal thin film is effective to inhibit the reaction otherwise occurring between the oxide and the films, while positively preventing the formation of the boundary layer with inferior magnetic properties.

Likewise, the provision of the non-magnetic film having high-hardness between the ferromagnetic metal thin film and the oxide glass is effective to prevent the erosion of the film by the molten glass, while also improving the molten glass fluidity.

BRIEF DESCRIPTION OF THE DRAWINGS

FIG. 1 is a perspective view showing an embodiment of the magnetic transducer head according to the present invention.

FIG. 2 is a plan view showing the contact surface thereof with the magnetic tape.

FIG. 3 is a perspective view showing the magnetic transducer head shown in FIG. 1, with the head exploded along the magnetic gap surface.

FIG. 4 is a plan view showing the contact surface with the magnetic tape and especially showing the construction of the non-magnetic film having high-hardness.

FIG. 7 to 14 are diagrammatic perspective views showing the manufacture process for the magnetic transducer head shown in FIG. 1, wherein FIG. 7 shows the step of forming a first series of grooves, FIG. 8 the step of forming the non-magnetic film having high-hardness, FIG. 9 the step of forming the ferromagnetic metal thin film, FIG. 10 the step of forming the non-magnetic film having high-hardness, FIG. 11 the step of charging molten glass filler and the surface grinding step, FIG. 12 the step of forming a second series of grooves, FIG. 13 the step of forming the winding slot, and FIG. 14 the step of melt bonding or glass bonding.

FIG. 16 shows the step of forming a series of multi-facet grooves, FIG. 17 the step of charging oxide glass, FIG. 18 the step of forming a second series of multi-facet grooves, FIG. 19 the step of forming a non-magnetic film having high-hardness, FIG. 20 the step of forming a ferromagnetic metal thin film, FIG. 21 the step of forming the non-magnetic film having high-hardness, FIG. 22 shows the step of charging molten oxide glass and the surface grinding step, FIG. 23 the step of forming the winding slot, and FIG. 24 the step of melt bonding or glass bonding.

FIG. 25 to 33 are perspective views showing the process steps for a third embodiment of the present invention, wherein FIG. 25 shows the step of forming a first series of grooves, FIG. 26 the step of charging the glass with high melting temperature, FIG. 27 the step of forming a second series of grooves, FIG. 28 the step of forming a non-magnetic film having high-hardness, FIG. 29 the step of forming the ferromagnetic metal thin film, FIG. 30 the step of forming a non-magnetic film having high-hardness, FIG. 31 the step of charging molten oxide glass filler and the surface grinding step, FIG. 32 the step of forming the winding slot and FIG. 33 the step of melt bonding or glass bonding.

DESCRIPTION OF THE PREFERRED EMBODIMENTS

Figure 38:
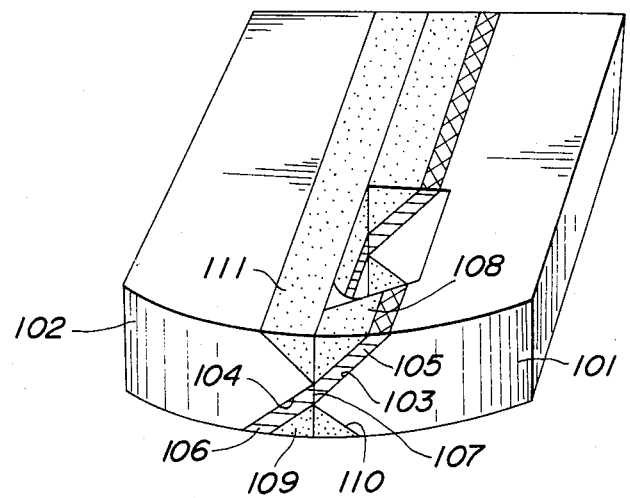
FIG. 38 is a perspective view showing the arrangement of the conventional magnetic transducer head.

To overcome the drawbacks existing in the prior art, we proposed a novel composite type magnetic transducer head suitable for high density recording on high coercive force magnetic tape, such as metal magnetic tape disclosed in our copending U.S. patent application Ser. No. 686,540 filed Dec. 26, 1984. The magnetic transducer head is composed of a pair of magnetic core elements 101, 102 of ferromagnetic oxides such as Mn-Zn ferrite, as shown in FIG. 38. The abutment sides of these core elements are cut obliquely for defining surface 103, 104. On these, the ferromagnetic metal thin films 105, 106, such as Fe-Al-Si alloy (so-called Sendust) are deposited by employing the physical vapor deposition. The magnetic gap 107 is defined by abutting the ferromagnetic metal thin films 105, 106 to each other, and glass fillers 108, 109 having low melting point or glass fillers 110, 111 having high melting point are charged in the molten state for procuring the contact surface with the tape and preventing the wear of the ferromagnetic metal thin films 105, 106. The magnetic transducer head is superior in operational reliability, magnetic properties and wear resistance.

However, these composite type magnetic transducer heads suffer from inconveniences especially as to the behavior of the boundary layers between the different kinds of materials, such as the ferromagnetic oxide-ferromagnetic metal thin film-oxide glass boundary layers.

For example, when the ferromagnetic metal thin film is deposited as by sputtering on the ferromagnetic oxide (ferrite), the ferrite interface in contact with the metal is subjected to an elevated temperature in the range of 300° to 700° C. This causes the reaction to take place on the ferromagnetic metal thin film ferromagnetic oxide interface and the oxygen atoms in the ferrite start to be diffused towards an equilibrium state in the temperature range of 300° to 500° C. so as to be bonded with Al, Si and Fe. The result is that the ferrite surface is slightly deoxidized and the contents of oxygen atoms are decreased so that the boundary layer with inferiority in the magnetic properties is produced on the interface between the ferrite and the ferromagnetic metal thin film. When the boundary layer with the inferior magnetic properties is produced in this manner, the soft magnetic properties of the ferrite are lowered by increase in the magnetic reluctance in the layer, so that the recording characteristics and reproduction output of the magnetic transducer head is lowered. In addition, the magnetic transducer head is formed by the ferromagnetic metal thin films and the ferromagnetic oxides having different thermal expansion coefficients. For example, the thermal expansion coefficient for Fe-Al-Si alloy is 130 to $160 \times 10^{-7}/°C$., whereas that of the ferrite is 90 to $110 \times 10^{-7}/°C$. Thus a stress is necessarily induced in the material in the course of the post-sputtering process such as melt bonding process, resulting in the destruction or breakage of the ferromagnetic metal thin films or deterioration in mechanical properties.

Also, when the glass is directly charged in the molten state after the deposition of the Fe-Al-Si alloy, the ferromagnetic metal material may be eroded by some kinds of molten glass. The reaction between the metal and the glass may cause the edge or surface of the ferromagnetic metal thin films to be deformed thus affecting the material properties or dimensional accuracy. With some kinds of the materials directly contacting with molten glass, problems are presented such as decreased fluidity or bubbles in the molten glass.

The magnetic transducer head according to a first embodiment of the present invention is firstly explained, in which a ferromagnetic metal thin film is continuously formed from the front side or the contact surface of the head with the magnetic tape to the back side or the back gap forming surface of the magnetic transducer head.

FIG. 1 is a perspective view showing an example of the composite magnetic transducer head embodying the present invention. FIG. 2 is a plan view showing the contact surface of the head with the magnetic tape, and FIG. 3 is a perspective view of the magnetic transducer head shown exploded along the gap forming surface.

This head is composed of core elements 10, 11 formed of ferromagnetic oxides, such as Mn-Zn ferrite. On the junction surfaces of the core elements 10, 11, there are formed ferromagnetic metal thin films 13 of ferromagnetic metal or high permeability metal alloy, such as Fe-Al-Si alloys, by using the physical vapor deposition method, such as sputtering by the medium of non-magnetic films having high-hardness 12. The film 13 are continuously formed from the front gap forming surface to the rear gap forming surface. These core elements 10, 11 are placed in abutment with each other with the intermediary of a spacer formed of e.g. SiO$_2$ so that the abutment surfaces of the thin films 13 are used as a magnetic gap g with a track width Tw. When seen from the contact surface with the magnetic tape, the thin films 13 are deposited on the core elements 10, 11 along a straight continuous line inclined an angle $\theta$ with respect to a magnetic gap forming surface 14 or the junction or abutment surfaces of the magnetic core elements 10, 11.

Non-magnetic films having high-hardness 15 are also formed on the ferromagnetic metal thin films 13. In the vicinity of the magnetic gap surface or on both sides of a magnetic gap g on the head surface facing to the magnetic tape is filled non-magnetic oxide glass at 16, 17 for defining the track width.

The angle between the ferromagnetic metal thin film forming surfaces 10a, 11a and the magnetic gap forming surface 14 is preferably in the range from 20° to 80°. The angle $\theta$ less than 20° is not preferred because of increased crosstalk with the adjoining tracks. Thus, the angle larger than 30° is most preferred. The angle $\theta$ less than about 80° is also preferred because wear resistance is lowered with the angle equal to 90°. The angle $\theta$ equal to 90° is also not preferred because the thickness of the thin film 13 need to be equal to the track width Tw which gives rise to the nonuniform film structure and the time-consuming operation in forming the thin film in vacuum or under reduced pressure.

The deposited metal thin film 13 need only be of a film thickness t such that $$t = Tw \sin \theta$$

wherein Tw represents a track width and $\theta$ represents an angle between the surfaces 10a, 11a and the magnetic gap forming surface 14. The result is that the film need not be deposited to a thickness equal to the track width and hence the time required for the preparation of the magnetic transducer head may be notably reduced.

The metal thin films 13 may be formed of the ferromagnetic metals including Fe-Al-Si alloys, Fe-Al alloys, Fe-Si alloys, Fe-Si-Co alloys, Ni-Fe alloys (so-called permalloys), ferromagnetic amorphous metal alloys, such as metal-metalloid amorphous alloys, e.g. an alloy of one or more elements selected from the group of Fe, Ni and Co with one or more elements selected from the group of P, C, B and Si, or an alloy consisting essentially of the firstly mentioned alloy and containing Al, Ge, Be, Sn, In, Mo, W, Ti, Mn, Cr, Zr, Hf, or Nb, or a metal-metal amorphous alloy consisting essentially of transition metal elements and glass forming metal elements such as Hf or Zr.

The films 13 may be deposited by any of the vacuum film forming methods including flash deposition, vacuum deposition, ion plating, sputtering or cluster ion beam methods.

Preferably, the composition of the Fe-Al-Si alloys is so selected the Al contents are in the range from 2 to 10 weight percent, and the Si contents are in the range from 4 to 15 weight percent, the balance being Fe. Thus it is preferred that, when the Fe-Al-Si alloys are expressed as Fe a Al b Si c where, a, b, and c represent the weight ratio of the respective associated components, the values of a, b and c are in the range such that $70 \leq a \leq 95$ $2 \leq b \leq 10$ $4 \leq c \leq 15$ If the Al or Si contents are too low or too high, magnetic properties of the Fe-Al-Si alloys are lowered.

In the above composition, a part of Fe may be replaced by at least one of Co and Ni.

The saturation magnetic flux density may be improved by replacing a part of Fe with Co. Above all, the maximum saturation magnetic flux density Bs may be achieved when 40 weight percent of Fe is replaced by Co. Preferably, the amount of Co is 0 to 60 weight percent relative to Fe.

On the other hand, by replacing a part of Fe with Ni, magnetic permeability may be maintained at a higher value without lowering the saturation magnetic flux density Bs. In this case, the amount of Ni is preferably in the range from 0 to 40 weight percent related to Fe.

Other elements may also be added to the Fe-Al-Si alloys for improving its corrosion and wear resistance. The elements that may be used as such additives may include IIIa group elements including lanthanides such as Sc, Y, La, Ce, Nd and Gd; IVa group elements such as Ti, Zr or Hf; Va groups such as V, Nb or Ta; VIa group elements such as Cr, Mo or W; VIIa group elements such as Mn, Te or Re; Ib group elements such as Cu, Ag or Au; elements of the platinum group such as Ru, Rh or Pd; and Ga, In, Ge, Sn, Sb or Bi.

When employing the Fe-Al-Si alloy, the ferromagnetic metal thin films 13 are preferably deposited in such a manner that the direction of the columnar crystal growths be inclined at a predetermined angle $\lambda$ of 5° to 45° with respect to a normal line drawn to the surfaces 10a, 11a of the magnetic core elements 10, 11.

When the thin films 13 are caused to grow in this manner at a predetermined angle $\lambda$ with respect to the normal line drawn to the surfaces 10a, 11a the magnetic properties of the resulting ferromagnetic metal thin films 13 are stable and superior resulting in improved magnetic properties of the magnetic transducer head.

Although the films 13 are formed as the single layer by the above described physical vapor deposition, a plurality of thin metal layers may be also be formed with an electrically insulating film or films such as $SiO_2$, $Ta_2O_5$, $Al_2O_3$, $ZrO_2$ or $Si_3N_4$ between the adjacent thin metal layer or layers. Any desired number of the ferromagnetic metal layers may be used for the formation of the metal thin film.

The non-magnetic films having high-hardness 12 interposed between the core elements 10, 11 and the metal thin films 13 may be formed of (A) one or more of oxides such as $SiO_2$, $TiO_2$, $Ta_2O_5$, $Al_2O_3$, $Cr_2O_3$ or the glass with high melting temperature, and deposited to a film thickness of 50 to 2000 Å, or formed of (B) non-magnetic metals such as Cr, Ti or Si either singly or as an alloy and deposited to a film thickness of 50 to 2000 Å. The materials of the groups (A) and (B) may be used separately or concurrently. An upper limit is set to the non-magnetic films having high-hardness 12 because of the pseudo-gap and since the magnetic reluctance is no longer negligible for a higher film thickness.

By forming the non-magnetic film having high-hardness 15 on the metal thin film 13, the high-output magnetic transducer head may be obtained by reason of the decreased glass erosion, decreased breakage of the ferromagnetic metal thin film 13, improved dimensional accuracy, glass fluidity or yield rate, and dispersion of the residual strain induced by glass bonding. The non-magnetic film having high-hardness 15 may be formed of refractory metals such as W, Mo or Ta and oxides thereof, in addition to the materials of the groups (A) and (B) for the non-magnetic films having high-hardness 12. These materials may be used singly or as an admixture, such as $Cr+Ta_2O_5+Cr$, $Cr+SiO_2+Cr$, $Ti+TiO_2+Ti$, and are formed to a thickness less than several microns.

Thus, as shown for example in FIG. 4, a non-magnetic film having high-hardness 12 of the dual layer structure consisting of a $SiO_2$ layer 12a and a Cr layer 12b is provided between the core elements 10, 11 and the metal thin film 13, and a non-magnetic film having high-hardness 15 of a triple layer structure consisting of a Cr layer 15a, $Ta_2O_5$ layer 15b and a second Cr layer 15c may be formed between the metal thin film 13 and the oxide glass 16.

In the above described magnetic transducer head, the ferromagnetic metal thin films 13 are deposited on the surfaces 10a, 11a of the ferrite core elements 10, 11 through the intermediary of the non-magnetic films having high-hardness 12. This prevents the diffusion into the metal thin films 13 of the oxygen atoms of the ferrite on account of the presence of the non-magnetic films having high-hardness 12 even under high temperature conditions prevailing during the sputtering, for preventing the formation of the boundary layer with inferiority in the magnetic properties. Hence, the soft magnetic properties of the vicinity of the surfaces 10a, 11a connected by a magnetic circuit to the metal thin film 13 are not deteriorated so that the reduction in the recording characteristics and playback output of the magnetic head is prevented from occurring. Also, since the surfaces 10a, 11a on which are formed the magnetic metal thin films 13 are inclined at a certain angle with respect to the magnetic gap forming surface 14, pseudo gaps are not induced even when the non-magnetic films having high-hardness 12 are of a certain film thickness. The film 12 with too large a thickness is however not desirable for the proper function of the magnetic circuit.

Upon comparative tests on the playback output of the magnetic transducer head with that of the conventional magnetic head have revealed that an increase in the output level of the order of 1 to 3 dB may be obtained with the signal frequency e.g. of 1 to 7 MHz.

Since the aforementioned boundary layer is not formed during the sputtering step, limitations on the sputtering speed or temperature may be removed partially resulting in the facilitated manufacture of the transducer head.

Also, since the thermal stress induced by the differential thermal expansion between the ferrite core elements 10, 11 and the ferromagnetic metal thin films 13 is relaxed by the presence of the non-magnetic films having high-hardness 12, no cracks are formed in the metal thin film 13 even upon cooling following the sputtering or upon heating caused by subsequent step of glass melting. This is also favorable in improving the magnetic properties.

Likewise, since the non-magnetic film having high-hardness 15 is formed between the film 13 and the oxide glass 16, it is possible to inhibit the elongation of the ferromagnetic metal thin films 13 or to provide only a so-called short-range strain by dispersing the strain induced between the core elements 10, 11 and the oxide glass 16. Cracks or wrinkles in the films 13 are also prevented for improving the operating reliability of the magnetic head and the yield rate in the manufacture of the transducer head.

Figure 5:
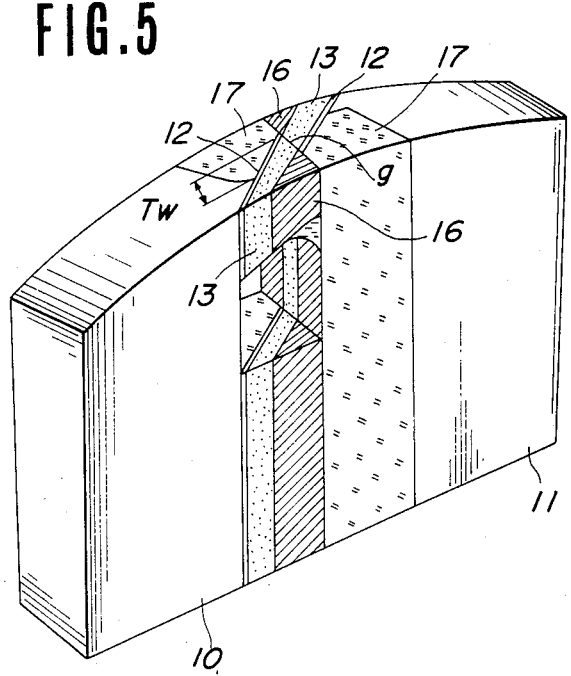
FIG. 5 shows in perspective a preferred construction of the magnetic transducer head in which the non-magnetic films having high-hardness are provided only on the interface between the ferromagnetic oxide and the ferromagnetic metal thin films and FIG. 6 shows in perspective a preferred construction of the magnetic transducer head in which the non-magnetic films having high-hardness are provided only on the interface between the ferromagnetic metal thin films and the oxide glass.
Figure 6:
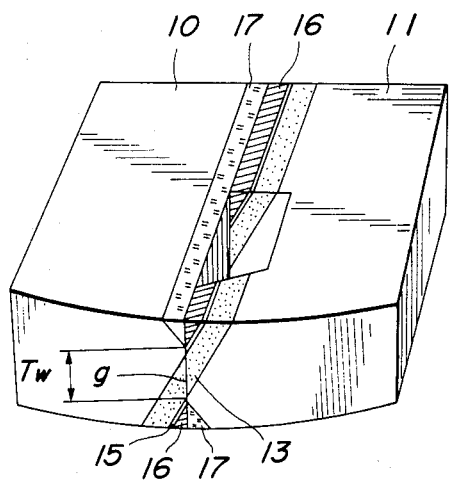

It should be noted that the non-magnetic films having high-hardness may be provided on the interface between the core elements 10, 11 and the metal thin films 13 as shown in FIG. 5 or on the interface between the metal thin films 13 and the oxide glass 16 as shown in FIG. 6. In FIGS. 5 and 6, the same parts or components as those shown in FIG. 1 are indicated by the same reference numerals.

The manufacture process of the above described embodiment will be explained for clarifying the structure of the magnetic transducer head.

Figure 7:
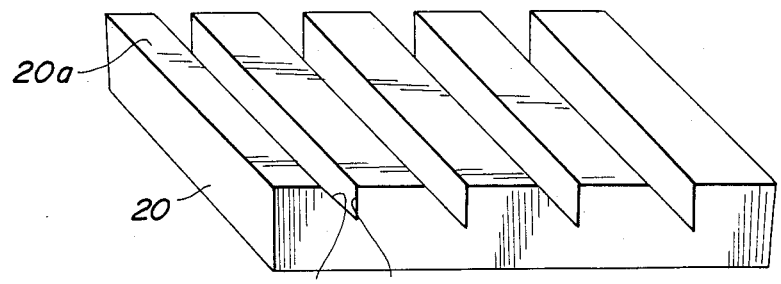

In preparing the magnetic transducer head of the present embodiment, a plurality of parallel vee grooves 21 are transversely formed on the upper surface 20a of a substrate 20 of ferromagnetic oxides, such as Mn-Zn ferrite, with the aid of a revolving grindstone, for forming a surface 21 on which to deposit the ferromagnetic metal thin films (FIG. 7). The upper surface 20a represents the junction or abutment surface of the ferromagnetic oxide substrate 20 with the corresponding surface of a mating substrate. The surface 21 is formed as an inclined surface having a present angle of inclination $\theta$ (equal to about 45° in the present embodiment) with respect to the magnetic gap forming surface of the substrate 20.

Figure 8:
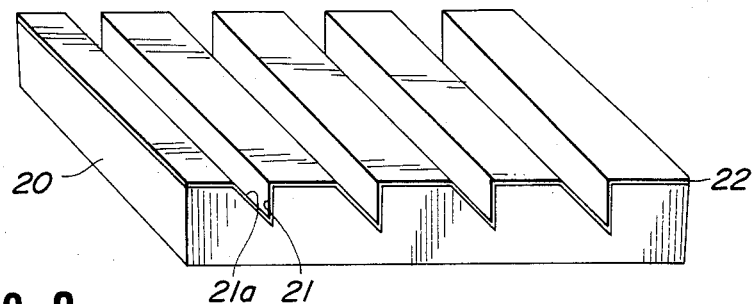

Then, as shown in FIG. 8, a non-magnetic film having high-hardness 22 is formed as by sputtering on the upper surface 20a of the ferromagnetic oxide substrate 20. This film 22 is formed by providing a first non-magnetic film having high-hardness by depositing e.g. $SiO_2$ to a thickness of 300 Å and a second non-magnetic film having high-hardness by depositing a Cr film to a thickness of 300 Å on the first non-magnetic film having high-hardness.

Figure 9:
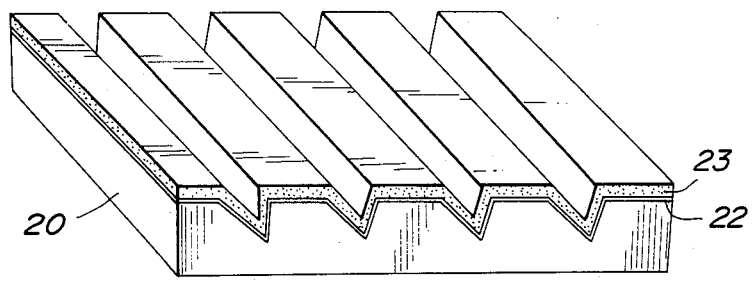

Then, as shown in FIG. 9, Fe-Al-Si alloy or amorphous alloy is applied to the non-magnetic film having high-hardness 22 by employing any of the physical vapor deposition such as sputtering, ion-plating or vacuum deposition, for providing the ferromagnetic metal thin film 23.

Figure 10:
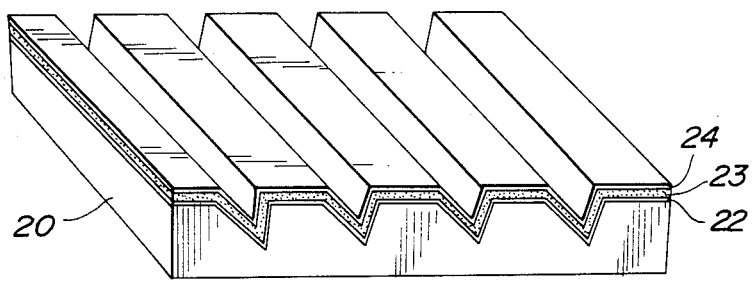

Then, as shown in FIG. 10, a non-magnetic film having high-hardness 24 is also formed on the ferromagnetic metal thin film 23. The film 24 is formed by applying a first Cr film to a thickness of approximately 0.1 $\mu$m, then applying a $Ta_2O_5$ film to a thickness of 1 $\mu$m and finally applying a second Cr film to a thickness of approximately 0.1 $\mu$m. The film 24 is preferably formed of high-melting metal such as W, Mo, Si or Ta, oxides or alloys thereof, and deposited to a thickness less than several microns. The bonding of the non-magnetic film having high-hardness 24 to the ferromagnetic metal thin film is improved by the first Cr film.

Figure 11:
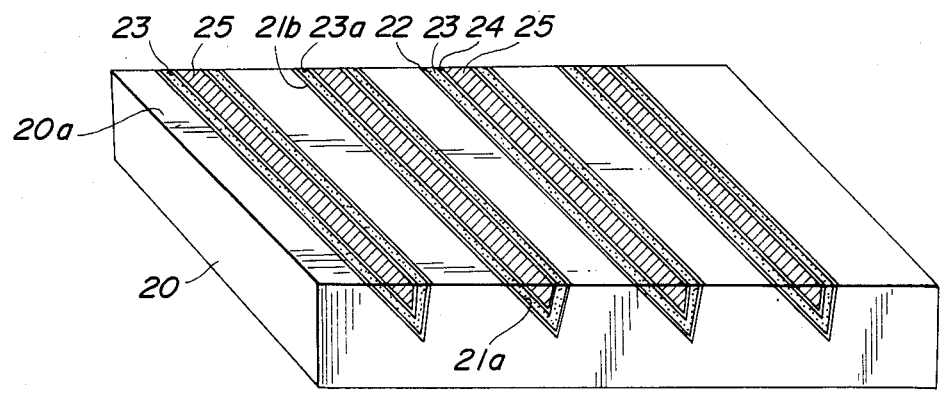

Then, as shown in FIG. 11, on oxide glass filler 25 such as the glass with the low melting point is filled in the first grooves 21 in which the films 23, 22, 24 are previously deposited. The upper surface 20a of the substrate 20 is ground smooth for exposing on the upper surface 20a the ferromagnetic metal thin film 23 deposited on the surface 21a.

Figure 12:
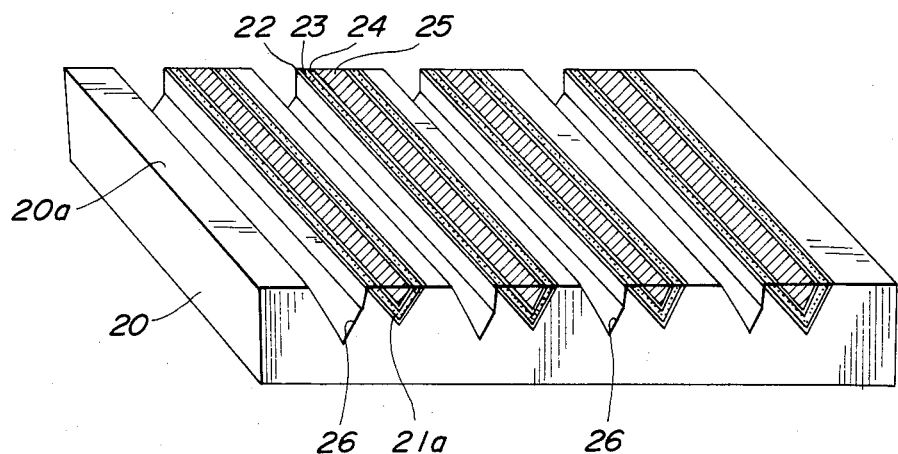

Then, as shown in FIG. 12, adjacent to the surface 21a on which is previously applied the ferromagnetic metal thin film 23, a second groove 26 is cut in parallel to the first groove 21 and so as to slightly overlap with one side edge 21a of the first groove 21. The upper surface 20a of the substrate 20 is then ground to a mirror finish. As a result of this process step, the track width is regulated in such a manner that the magnetic gap is delimited solely by the ferromagnetic metal thin film.

The second groove 26 may also be polygonal in cross-section instead of being vee shaped and the inner wall surface of the groove 26 may be stepped with two or more stages for procuring a distance from the ferromagnetic oxide and the ferromagnetic metal thin films when viewed from the contact surface with the tape. With the groove configuration, it is possible to reduce the crosstalk otherwise caused by the reproduction of the long wavelength signals may be reduced while the large junction area between the ferromagnetic oxide and the ferromagnetic metal thin film is ensured. Also, with the above groove configuration, the end face of the ferromagnetic oxide is inclined in a direction different from the azimuth angle direction of the magnetic gap so that signal pickup from the adjoining or next adjoining track or crosstalk may be reduced by virtue of the azimuth loss.

Also, since the ferromagnetic metal thin film 23 is first formed on the surface 21a and the second groove 26 is then formed for the regulation of the track width, it is possible to manufacture the magnetic transducer head with high yield rate and high accuracy of the track width by adjusting the machining position of the second groove 26. Thus, when the transducer head is of the type in which the magnetic flux is passed through the ferromagnetic oxide via a minimum distance from the magnetic gap formed only by the ferromagnetic metal thin film, the output and productivity as well as operating reliability of the head are improved with low manufacture costs.

Figure 13:
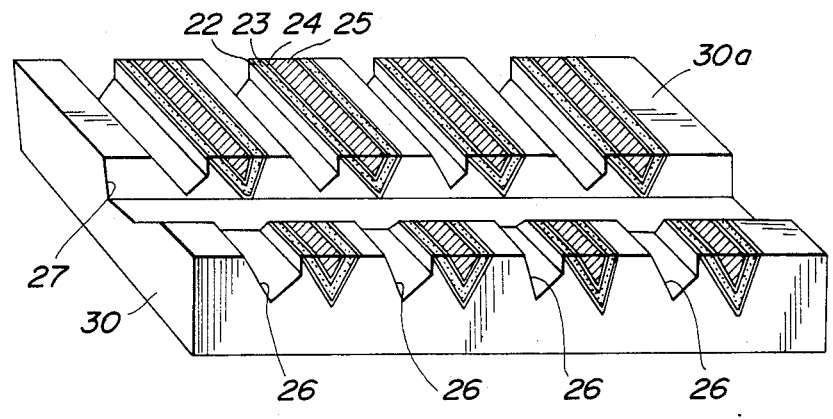

A pair of similar ferromagnetic oxide substrates 20 are formed by the above described process. A groove is cut on one of the substrates at right angle with the first groove 21 and the second groove 26 for providing a ferromagnetic oxide substrate 30 provided with a winding slot 27 (FIG. 13).

Figure 14:
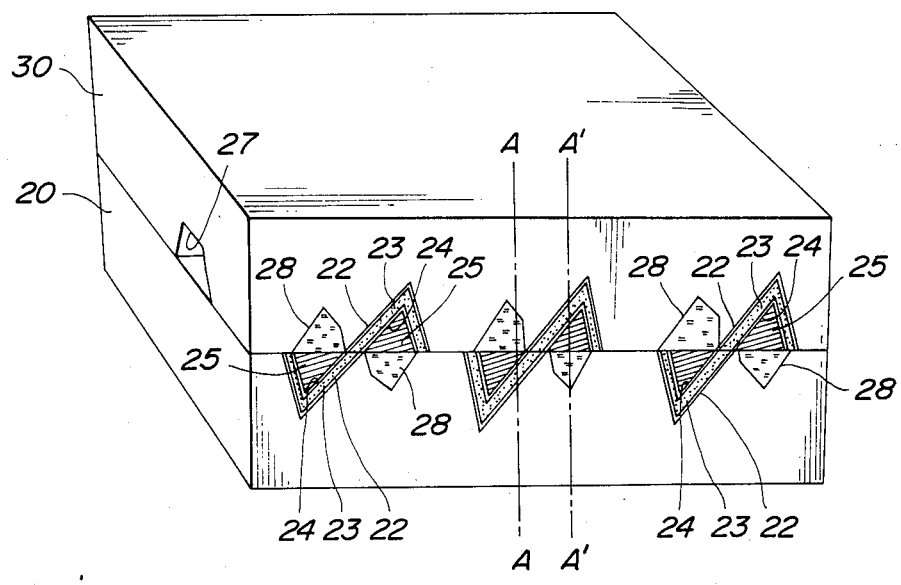

A gap spacer is then applied on the upper surface 20a of the substrate and/or the upper surface 30a of the substrate 30. Then, as shown in FIG. 14, these substrates 20, 30 are positioned with the respective metal thin films 23 abutting to each other. These substrates 20, 30 are bonded with molten glass while simultaneously the second groove 26 is charged with molten glass 28. The gap spacer may be formed of $SiO_2$, $ZrO_2$, $Ta_2O_5$ or Cr, as desired. In the above process, charging of the glass 28 in the second groove 26 need not be effected simultaneously with the bonding of the substrates 20, 30. Thus the glass 28 may be charged in the step shown e.g. in FIG. 13 so that the step shown in FIG. 14 may consist only of the glass bonding step.

The superimposed substrates 20, 30 may then be sliced along e.g. lines A—A and A'—A' in FIG. 14 for producing a plurality of head chips, and the contact surface of each head chip with the magnetic tape is then ground to a cylindrical surface for providing the magnetic transducer head shown in FIG. 1. The slicing direction through the substrates 20, 30 may be inclined with respect to the abutment surface for providing the azimuth recording magnetic transducer head.

It should be noted that one of the core elements 10 consists essentially of the ferromagnetic oxide substrate 20 while the other core element 11 consists essentially of the ferromagnetic oxide substrate 30. The ferromagnetic metal thin film 13 corresponds to the ferromagnetic metal thin film 23 and the non-magnetic films having high-hardness 12, 15 correspond to the non-magnetic films having high-hardness 22, 24, respectively. The ferromagnetic metal thin film 23 formed on a planar surface exhibits high uniform magnetic permeability along the path of magnetic flux.

Figure 15:
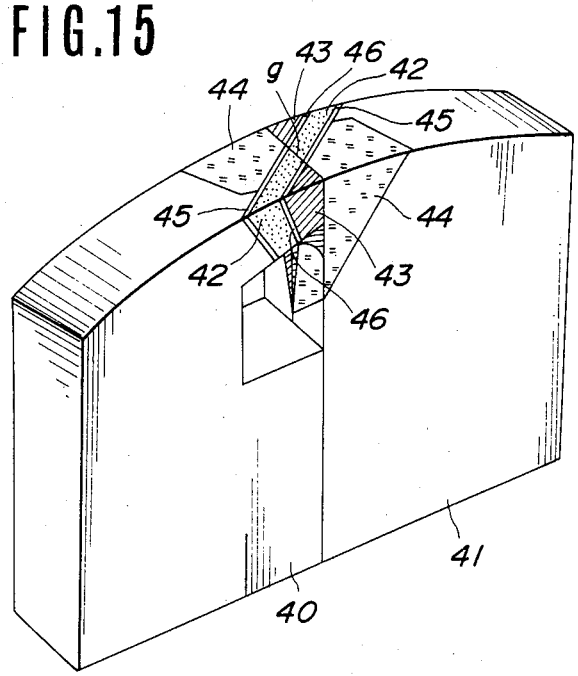
FIG. 15 is a perspective view showing a second embodiment of the invention.

The magnetic transducer head according to a modified embodiment in which the ferromagnetic metal thin film is formed only in the vicinity of the magnetic gap is hereafter explained by referring to FIG. 15.

In the present embodiment, the ferromagnetic metal thin film is formed only in the vicinity of the magnetic gap of the magnetic transducer head, wherein a pair of magnetic core elements 40, 41 are formed of ferromagnetic oxides such as Mn-Zn ferrite and the ferromagnetic metal thin films 42 are formed only on the front depth side in the vicinity of the magnetic gap g by applying the high permeability alloy such as Fe-Al-Si alloy thereto by the physical vapor deposition such as sputtering. Oxide glass fillers 43, 44 are charged in the molten state in the vicinity of the gap forming surface. The non-magnetic films having high-hardness 45 consisting, for example, of oxides such as $SiO_2$, $TiO_2$ or $Ta_2O_5$ or non-magnetic metals such as Cr, Ti or Si are provided between the ferromagnetic metal thin films 42 and the magnetic core elements 40, 41 of ferromagnetic oxides, as in the preceding embodiment. Non-magnetic films having high-hardness 46 consisting, for example, of refractory metals or oxides thereof, such as $Ta_2O_5$, Cr, $TiO_2$ or $SiO_2$, are provided between the metal thin films 42 and the oxide glass fillers 43. The metal thin films 42 are inclined at a preset angle $\theta$ relative to the magnetic gap forming surface when seen from the contact surface with the tape, as in the preceding embodiment.

The magnetic transducer head may be manufactured by the manufacture process steps shown in FIGS. 16 to 24.

Figure 16:
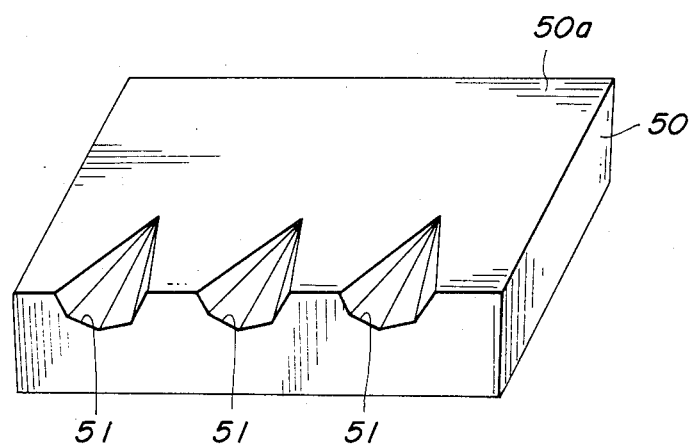
FIG. 16 to 24 are perspective views showing the sequential steps for the manufacture thereof, therein

Firstly, as shown in FIG. 16, a plurality of grooves 51 of polygonal cross-section are formed on one longitudinal edge of the ferromagnetic oxide substrate 50 of Mn-Zn ferrite by means of a rotary grindstone or with the aid of electrolytic etching. The upper surface 50a of the substrate 50 corresponds to the magnetic gap forming surface, and the multi-facet groove 51 is provided in the vicinity of the magnetic gap forming position of the substrate 50.

Figure 17:
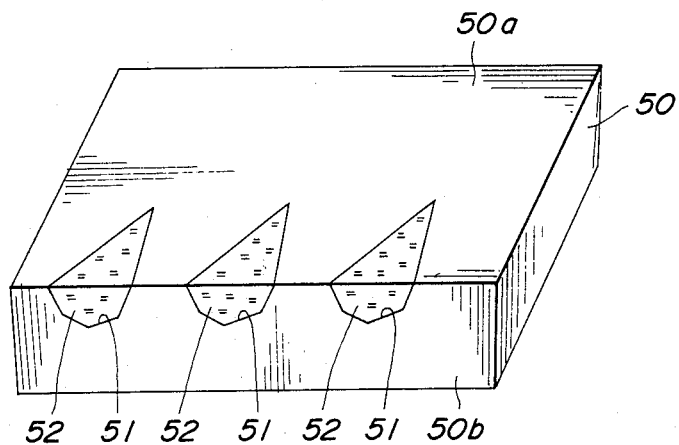

Then, as shown in FIG. 17, oxide glass fillers 52 are filled in the molten state in the groove 51, and both the upper surface 50a and the front surface 50b are ground smooth.

Figure 18:
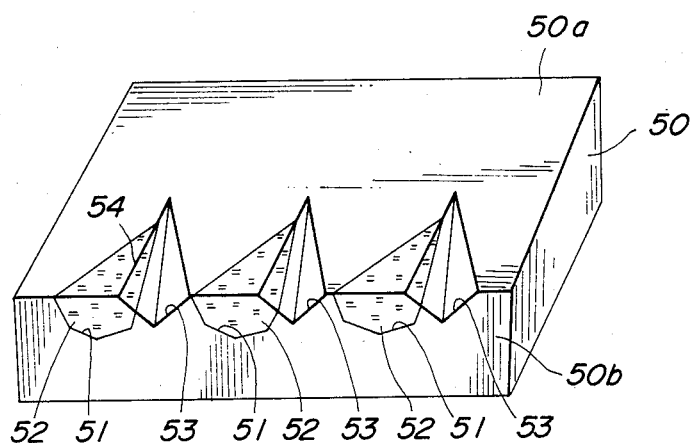
Figure 19:
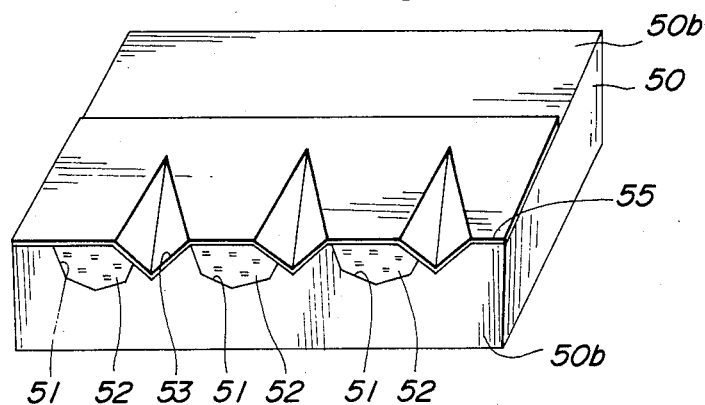

Then, as shown in FIG. 18, a plurality of vee grooves 53 are formed on the substrate edge so as to be adjacent to and partly overlap with the one facet of the groove 51 in which the glass filler is previously filled as described hereinabove. At this time, part of the glass 52 is exposed on the facet or inner wall surface 53a of the groove 53. The line of intersection 54 between the inner wall surface 53a and the upper surface 50a is normal to the front surface 50b of the substrate 50. The angle the inner wall surface 53a makes with the upper surface may for example be 45°. Then, as shown in FIG. 19, $SiO_2$ is applied to a thickness of, for example, 300 Å so as to cover at least the grooves 53 of the substrate 50. Then, Cr is applied to a thickness of 300 Å for providing a non-magnetic film having high-hardness 55.

Figure 20:
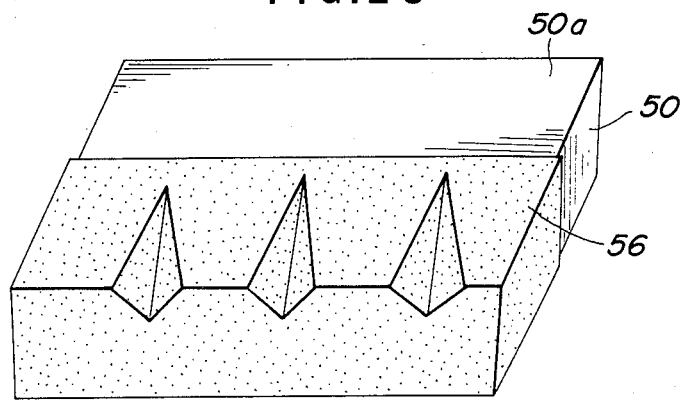

Then, as shown in FIG. 20, a high permeability alloy such as Fe-Al-Si alloy is formed in the vicinity of the grooves 53 over the non-magnetic film having high-hardness 55 by any of the above described physical vapor deposition such as sputtering, for providing the ferromagnetic metal thin film 56. During formation of the metal thin film 56, the substrate 50 may be disposed with a tilt in the sputtering apparatus so that the ferromagnetic metal may be efficiently deposited on the facet or inner wall surface 53a of the groove 53.

Figure 21:
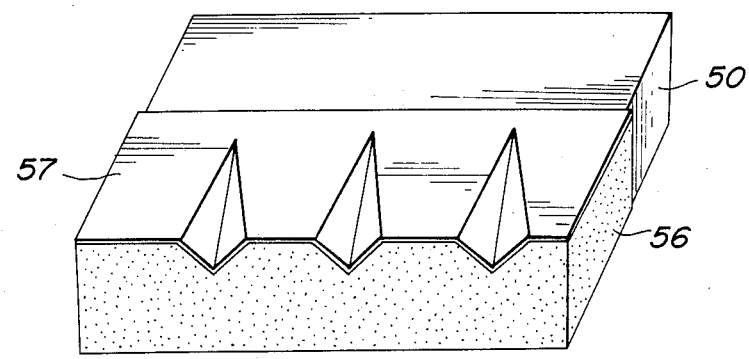

On the thus deposited metal thin film 56, the non-magnetic film having high-hardness 57 formed of, for example, $Ta_2O_5$, $TiO_2$ or $SiO_2$ is deposited as by sputtering (FIG. 21). In the present example, the dual non-magnetic film having high-hardness 57 is formed by applying a Cr film on the metal thin film 56 to a thickness of 0.1 μm by sputtering and applying a $Ta_2O_5$ film thereon to a thickness of approximately 1 μm, also by sputtering. By thus forming the Cr film on the metal thin film 56, the state of deposition of the $Ta_2O_5$ film on the metal thin film is improved. Although the non-magnetic film having high-hardness 57 of the present embodiment consists of the Cr and $Ta_2O_5$ layers, it may also be formed by depositing the Cr-$SiO_2$-$Ta_2O_5$ layers in this order or by depositing the Ti film to about 1 μm and the $TiO_2$ layer to about 1 μm in this order.

Figure 22:
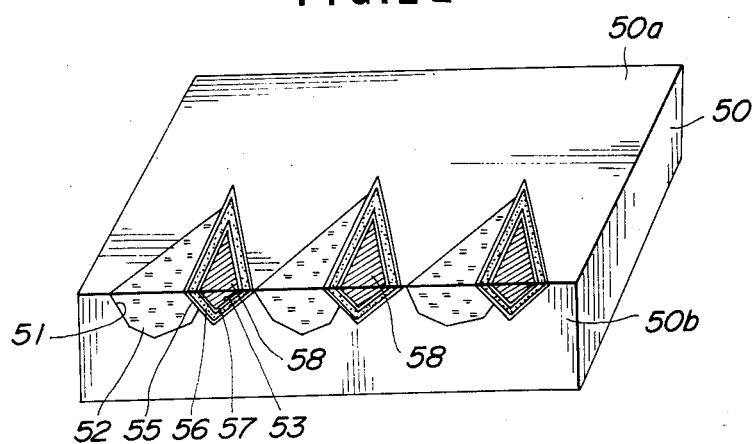

Then, in the groove 58 in which the non-magnetic film having high-hardness 55, the ferromagnetic metal thin film or layer 56 and the non-magnetic film having high-hardness 57 are deposited one upon the other, the oxide glass 58 lower melting than the oxide glass 52 is filled in the molten state (FIG. 22). The upper surface 50a and the front surface 50b of the substrate 50 are ground to a mirror finish. On the front surface 50b of the substrate 50, the ferromagnetic metal thin film 56 formed on the inner wall surface 53a of the groove 53 is sandwitched between the previously applied non-magnetic films having high-hardness 55, 57.

Figure 23:
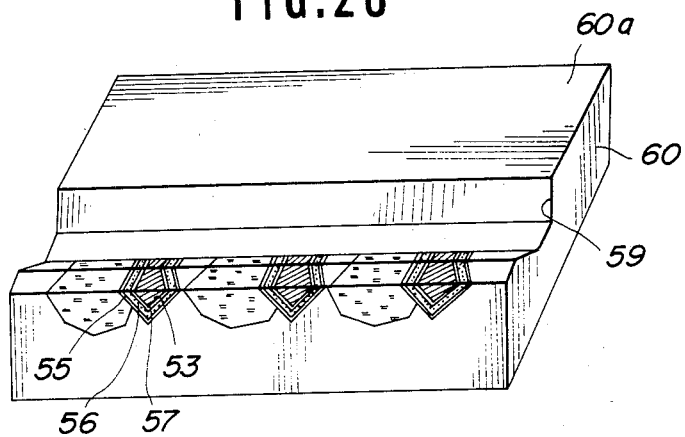

For forming the winding slot side magnetic core element, a winding slot 59 is cut in the ferromagnetic oxide substrate 50 previously processed as described above (FIG. 22) for providing the ferromagnetic oxide substrate 70 shown in FIG. 23.

Figure 24:
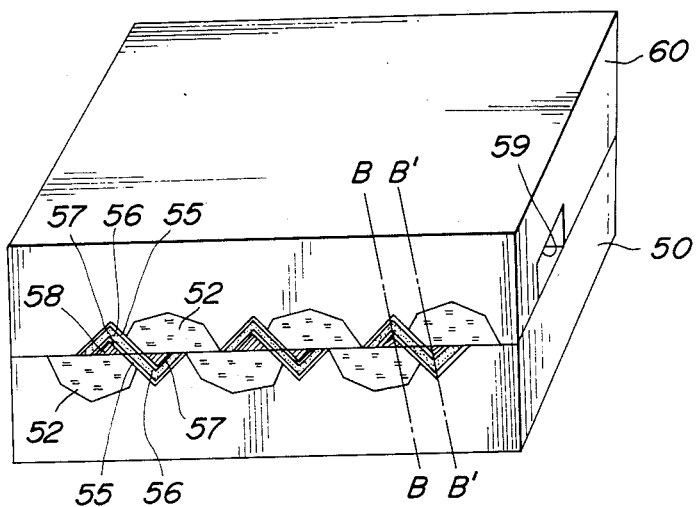

The substrates 50, 60 are abutted to each other as shown in FIG. 24, with the upper or magnetic gap forming surface 50a of the substrate 50 in contact with the upper or magnetic gap forming surface 60a of the substrate 60 by the intermediary of a gap spacer affixed to one of the upper surfaces 50a, 60a, and are bonded together by molten glass to a composite block which is then sliced along lines B—B and B'—B' in FIG. 24 for providing a plurality of head chips. The slicing operation may also be performed with the block inclined azimuth angle.

The contact surface of the head chip with the magnetic tape is ground to a cylindrical surface for completing the magnetic transducer head shown in FIG. 15.

It should be noted that one of the magnetic core elements 41 of the magnetic transducer head shown in FIG. 15 consists essentially of the ferromagnetic oxide substrate 51, while the other core element 40 consists essentially of the ferromagnetic oxide substrate 60. The non-magnetic films having high-hardness 45, 46 correspond to the non-magnetic films having high-hardness 55, 57, respectively, whereas the ferromagnetic metal thin film 42 corresponds to the ferromagnetic metal thin film 56. The oxide glass filler 43 corresponds to the oxide glass filler 58.

With the magnetic transducer head constructed as described hereinabove, the ferromagnetic metal thin film 42 exhibits a high uniform magnetic permeability along the direction of the pat of magnetic flux thus assuring a high stable output of the magnetic transducer head. Also the ferromagnetic metal thin film is protected by the non-magnetic films having high-hardness 45 against cracking or deformation.

Also, with the magnetic transducer head of the present embodiment, the ferromagnetic oxides are directly bonded together by glass on the back junction surface or back gap surface thus providing large destruction strength of the head chip and improved yield rate while assuring stability of the ferromagnetic metal thin film. Also, since the metal thin film is formed only in the vicinity of the magnetic gap g, the metal thin film 42 need be formed on a relatively small area. Thus the number of items disposable in one lot in the sputtering apparatus may be increased resulting in improved mass producibility.

A further example of the magnetic transducer head manufactured by an alternative process is explained by referring to FIGS. 25 to 34.

Figure 25:
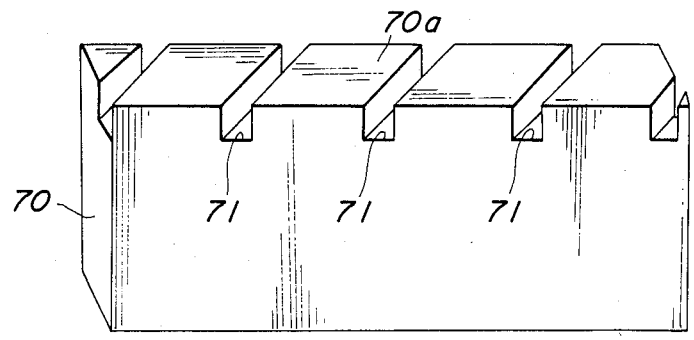

In preparing the magnetic transducer head, as shown in FIG. 25, a plurality of square shaped grooves 71 are formed obliquely on the upper surface 70a corresponding to the contact surface with the magnetic tape of the ferromagnetic oxide substrate 70 formed e.g. of Mn-Zn ferrite. The grooves 71 are of such a depth as to reach the winding slot of the head.

Figure 26:
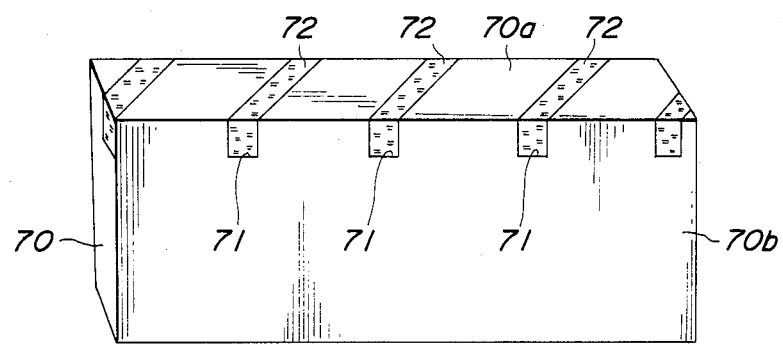

Then, as shown in FIG. 26, the glass filler 72 having the high melting temperature is filled in the molten state in the grooves 71. The upper surface 70a and the front surface 70b are then ground smooth.

Figure 27:
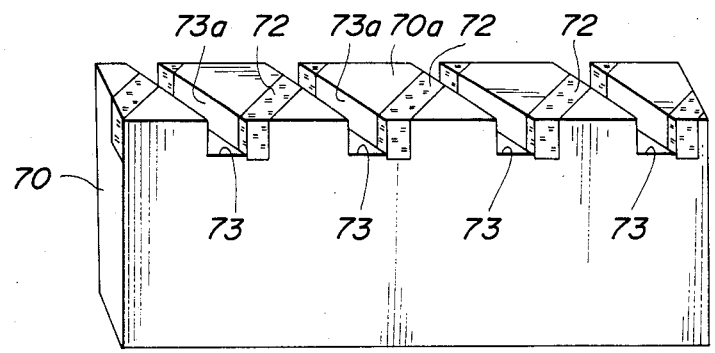

Then, as shown in FIG. 27, a plurality of second square shaped grooves 73 are formed on the upper surface 70a in the reverse oblique direction to and for partially overlapping with the first square shaped grooves 71 filled previously with the glass filler 72. The groove 73 is of nearly the same depth as the groove 71. The inner side 73a of the groove 73 is normal to the upper surface 70a of the substrate 70 and makes an angle of e.g. 45° with the front surface 70b. The inner side 73a of the groove 73 intersects the associated first groove 71 in the vicinity of the front side 70b of the substrate 70 for slightly cutting off the glass filler 72.

Figure 28:
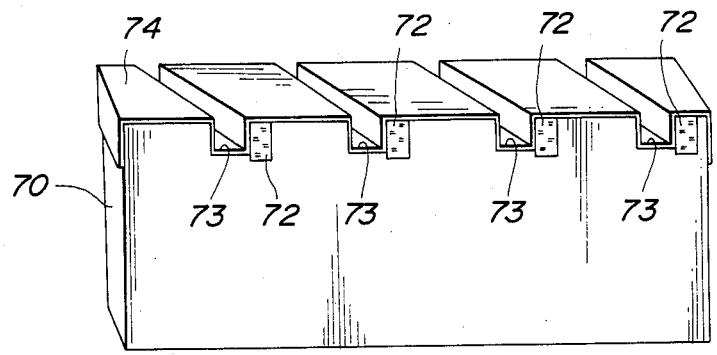

After the grooves 71, 73 are formed in this manner on the upper surface 70a of the ferromagnetic oxide substrate 70, a non-magnetic film having high-hardness 74 of e.g. $SiO_2$ or Cr is deposited in the vicinity of the groove 73 of the substrate 70, as shown in FIG. 28, by employing any of the above described physical vapor deposition, such as sputtering. The non-magnetic film having high-hardness 74 may be formed of the same materials as explained in the preceding embodiments.

Figure 29:
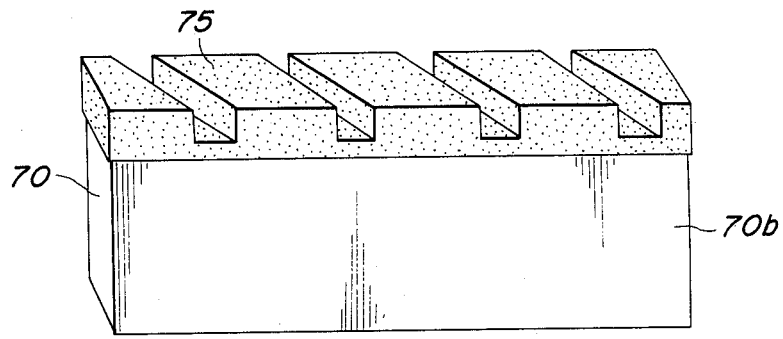

Then, as shown in FIG. 29, a high permeability alloy layer, such as Fe-Al-Si alloy layer is formed on the film 74 for providing a ferromagnetic metal thin film 75 by employing any of the above described physical vapor deposition, such as sputtering. The substrate 70 may be disposed with a tilt in the sputtering apparatus for achieving an efficient deposition of the alloy layer.

Figure 30:
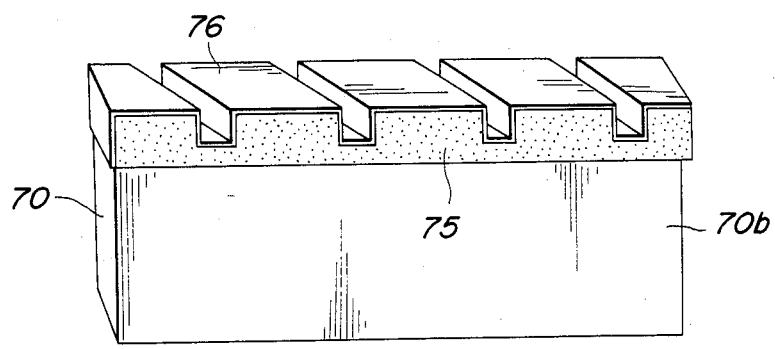

Then, as shown in FIG. 30, high-hardness metals, oxides or alloys thereof are applied to the film 75 as by sputtering, for providing the non-magnetic film having high-hardness 76. The non-magnetic film having high-hardness 76 may be formed of the same materials as explained in the preceding embodiments in one or plural layers.

Figure 31:
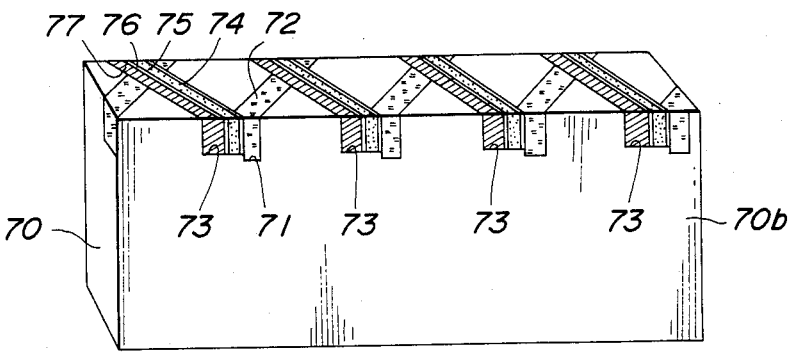

Then, as shown in FIG. 31, in the grooves 73 in which the non-magnetic films having high-hardness films 74, 76 and the ferromagnetic metal thin film 75 are deposited one upon the other, an oxide glass filler 77 lower melting than the glass filler 72 charged in the groove 71 is charged in the molten state. The upper surface 70a and the front surface 70b of the substrate 70 are ground to a smooth mirror finish. The result is that the metal thin film 75 is sandwitched and protected by the non-magnetic films having high-hardness 74, 76 on the inner side 73a of the groove 73. Although the films 74, 75, 76 persist on the other inner side and bottom of the groove 7, they are in negligible amounts and hence are not shown in the drawing.

Figure 32:
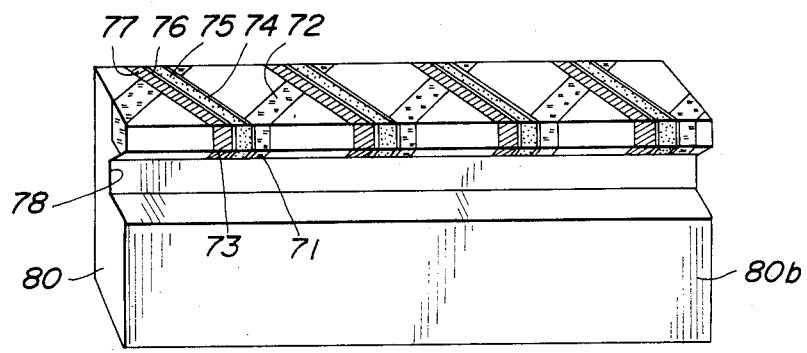

Then, a winding slot 78 is cut on one of the substrates for providing the ferromagnetic oxide substrate 80 (FIG. 32).

Figure 33:
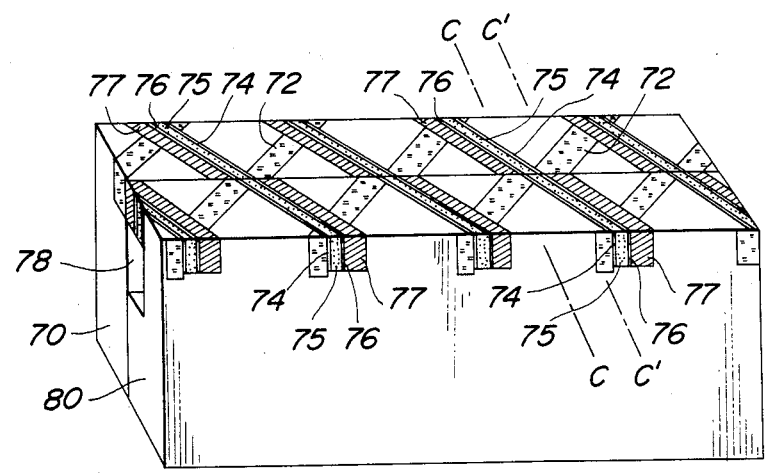

Then, as shown in FIG. 33, the substrate 80 provided with the winding slot 80 and the substrate 70 not provided with the winding slot are placed side by side with the intermediary of a gap spacer deposited on at least one of the magnetic gap forming front surface 70b, 80b, so that the metal thin films abut each other. The substrates 70, 80 are then united together by glass or melt bonding to a unitary block.

The block thus formed by the substrates 70, 80 are sliced along lines C—C and C'—C' in FIG. 33 for forming plural head chips. The abutting surfaces of these head chips with the magnetic tape are then ground to a cylindrical surface for completing the magnetic transducer head shown in FIG. 34.

Figure 34:
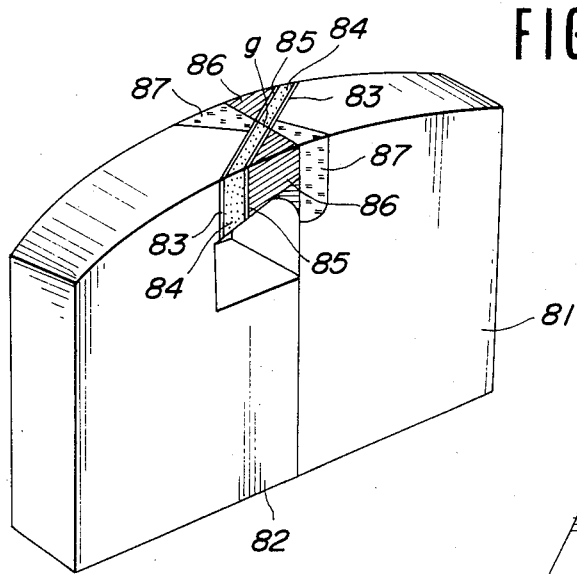
FIG. 34 is a perspective view showing the magnetic transducer head manufactures by the process steps of FIG. 25 to 33.

With the magnetic transducer head shown in FIG. 34, one of the magnetic core elements 81 corresponds to the ferromagnetic oxide substrate 70, while the remaining core element corresponds to the ferromagnetic oxide substrate 80. The ferromagnetic metal thin film 84 corresponds to the ferromagnetic metal thin film 75, whereas the non-magnetic films having high-hardness 83, 85 correspond to the non-magnetic films having high-hardness 74, 76, respectively. The oxide glass filler 86 corresponds to the oxide glass filler 77.

In the magnetic transducer head shown in FIG. 34, the ferromagnetic metal thin film 84 is sandwitched and protected by the non-magnetic films having high-hardness 83, 85 against cracking, deformation or deterioration in the boundary surface with the ferromagnetic oxides, similarly to the preceding embodiments, so that optimum results are achieved as in the case of the magnetic transducer heads shown in FIGS. 1 and 15. The metal thin film 84 is inclined at a preset angle to the surface forming the magnetic gap g and is formed linearly and continuously on one and the same surface thus assuring a high uniform magnetic permeability along the path of magnetic flux and providing a high stable output, as in the preceding embodiments.

The present invention is also applied to a magnetic transducer head in which the vicinity of the contact surface with the magnetic tape is protected by the non-magnetic elements having high-hardness, such as ceramic elements.

Figure 35:
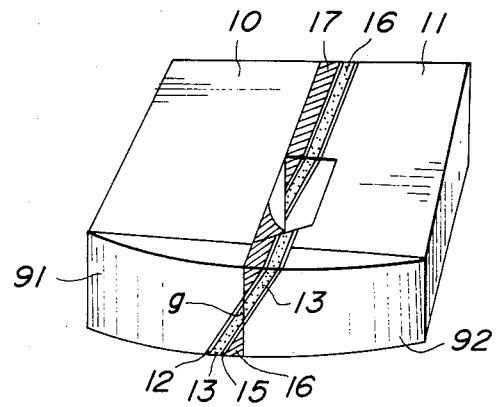
FIGS. 35 to 37, are perspective views showing three further embodiments of the present invention.
Figure 36:
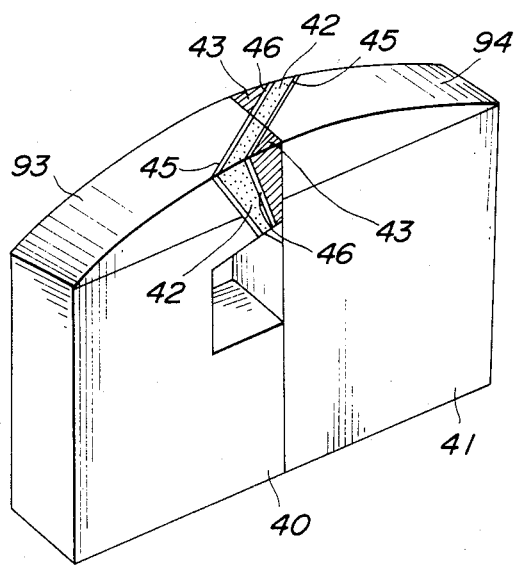
Figure 37:
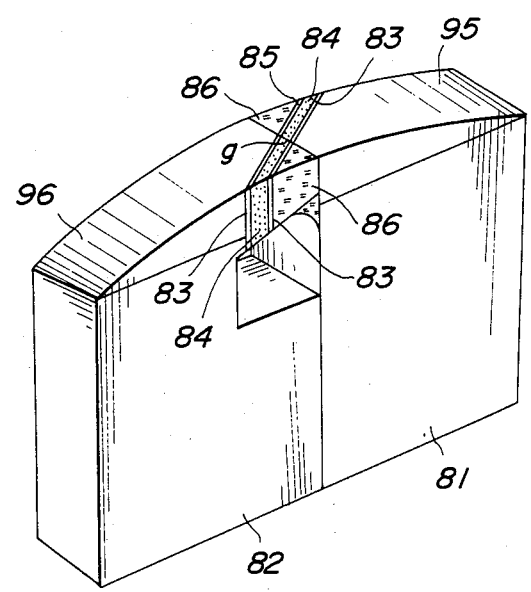

FIGS. 35 to 37 show an embodiment of the magnetic transducer head in which the vicinity of the contact surface with the magnetic tape is protected by non-magnetic elements having high-hardness, such as ceramic elements.

The magnetic transducer head shown in FIG. 35 corresponds to that shown in FIG. 1 so that components same as those shown in FIG. 1 are indicated by the same reference numerals. Thus the magnetic transducer head shown in FIG. 35 corresponds to the head of FIG. 1 wherein the protective elements 91, 92 formed of non-magnetic wear-resistant materials such as calcium titanate (Ti-Ca ceramics), oxide glass chips, titania ($TiO_2$) or alumina ($Al_2O_3$) are provided in the vicinity of the contact surface with the magnetic tape. The transducer head of FIG. 35 consists essentially of a composite substrate formed by thermal pressure bonding of a highly wear-resistant non-magnetic substrate of e.g. calcium titanate, oxide glass, titania or alumina to one end face of a ferro-magnetic oxide substrate of e.g. Mn-Zn ferrite with the intermediary of a molten glass plate about several tens of microns thick. The substrate is processed in accordance with the process similar to that shown in Figs. 7 to 14. Since the magnetic material such as ferrite is not exposed on the contact surface with the magnetic tape, the machining step shown in FIG. 12 for forming the second groove 26 may be dispensed with.

The magnetic transducer head shown in FIG. 36 corresponds to the magnetic transducer head shown in FIG. 15 and the components same as those shown in FIG. 15 are indicated by the same reference numerals. The magnetic transducer head shown in FIG. 36 corresponds to the magnetic transducer head shown in FIG. 15 in which protective elements 93, 94 of highly wear-resistant non-magnetic material are provided to the vicinity of the contact surface with the magnetic tape. The magnetic transducer head shown in FIG. 36 is fabricated from the similar composite substrate and by the manufacture process shown in FIGS. 16 to 24. In this case, the machining step for the groove 51 shown in FIG. 16 and the charging step of the molten oxide glass filler 52 shown in FIG. 17 may be dispensed with.

The magnetic transducer head shown in FIG. 37 corresponds to the magnetic transducer head shown in FIG. 34 and the components same as those of the magnetic transducer head shown in FIG. 34 are indicated by the same reference numerals. The transducer head shown in FIG. 37 corresponds to the head shown in FIG. 34 in which protective elements 95, 96 of highly wear-resistant non-magnetic material are provided in the vicinity of the contact surface with the magnetic tape. The magnetic transducer head of the present embodiment is fabricated from the composite substrates of the preceding embodiments and by using the process similar to that shown in FIGS. 25 to 33. In this case, the machining step of forming the groove 71 as shown in FIG. 25 and the charging step of the high melting glass filler 72 in the molten state as shown in FIG. 26 are similarly dispensed with.

In the respective magnetic transducer heads shown in FIGS. 35 to 37, wear-resistant non-magnetic elements are previously bonded to the ferromagnetic oxide block and ground for forming the abutting surface with the magnetic tape. In this manner, the portion of the abutting surface, inclusive of the gap surface, other than the magnetic metal thin film, is constructed of the non-magnetic materials, that is, the wear-resistant non-magnetic material and the non-magnetic films having high-hardness, so that the ferromagnetic oxide material is not exposed to the outside. Thus the track width is determined by the size of the inclined section of the ferromagnetic metal thin film irrespective of the terminal point of the gap surface grinding operation following the formation of the ferromagnetic metal thin film, thus allowing for broader manufacture tolerance of the substrate block. Also the ferromagnetic metal thin film is protected by the non-magnetic film having high-hardness, so that the magnetic transducer head is protected from deformation, cracking or degradation on the boundary layer in the course of glass bonding, thus assuring a high yield rate and a high stable output of the magnetic transducer head. In VTR heads, it is necessary to make use of single crystal ferrite projecting on the tape abutment surface because of the increased relative speed between the head and the tape, resulting in increased material costs. In the above described embodiments, the back gap side ferrite is not likely to undergo partial wear upon contact with the tape so that high-$\mu$ polycrystal ferrite (i.e. sintered type polycrystal ferrite) may be safely used with an attendant reduction in the material costs.

It will be apparent from the foregoing that the present invention provides an arrangement of the magnetic transducer head according to which non-magnetic film having high-hardness are interposed between the ferromagnetic metal thin film and the ferromagnetic oxides so that the diffusion of the oxygen atoms in the ferromagnetic oxides is prevented even under the elevated temperature during the time of application of the ferromagnetic metal thin film and hence there is no risk that the boundary layer with inferiority in magnetic properties due to low oxygen atom contents in not formed in the boundary layer with the ferromagnetic oxides. The result is that the soft magnetic properties of the ferromagnetic oxides are not deteriorated and the recording characteristics and playback output of the magnetic transducer head is also not lowered.

Since the boundary layer with inferior magnetic properties is not induced by sputtering, limitations on the sputtering speed or temperature in the course of application of the ferromagnetic metal thin film can be removed partially with a resulting merit in manufacture efficiency.

The non-magnetic film having high-hardness interposed between the oxide glass filler and the ferromagnetic metal thin film is effective to protect the oxide glass and improve glass fluidity while inhibiting the erosion by the oxide glass or the deformation of the ferromagnetic metal thin film.

The provision of the respective non-magnetic films having high-hardness is also effective to improve the bonding of the ferromagnetic metal thin film and to partially remove local stress such as thermal stress otherwise caused by the differential thermal expansion between the adjoining components during the postsputtering process such as cooling process for preventing crack or the like defects.

Therefore the ferromagnetic metal thin film is more stable and the magnetic properties are also stable with an improved accuracy in the track width so that the magnetic transducer head is reliable in strength and may be conveniently used with a high coercive force magnetic recording medium.

What is claimed is:

1. A magnetic transducer head for cooperating with a recording or reproducing track on a magnetic medium comprising:
   a first magnetic core element, and a second magnetic core element,
   each of said first and second core elements comprising a magnetic ferrite block, a magnetic metal thin film integrated with said magnetic ferrite block, and a non-magnetic thin film having a hardness greater than the hardness of said magnetic film, interposed between said magnetic ferrite block and said magnetic metal thin film,
   each of said first and second core elements having a first planar surface and a second planar surface portion adjacent to said first planar surface,
   said magnetic metal thin film on said first core element being provided on said second planar surface portion of said first core element and facing an edge thereof to said first planar surface of said first core element, said second planar surface portion of said first core element being slanted with respect to said first planar surface of said first core element,
   said magnetic metal thin film on said second core element being provided on said second planar surface portion of said second core element and facing an edge thereof to said first planar surface of said second core element, said second planar surface portion of said second core element being slanted with respect to said first planar surface of said second core element,
   said first and second core elements being bonded together along a bonding plane parallel to their said first surfaces, in such manner that an operating magnetic gap is formed between said edge of said magnetic metal thin film on said first core element and said edge of said magnetic metal thin film on said second core element, said track extending across said magnetic gap in a direction transverse to said bonding plane, said magnetic metal thin film on said first core element and said magnetic thin film on said second core element are in one common plane and forming a track width of said operating magnetic gap larger than the thickness of said magnetic metal thin film, and a common contact surface facing a travelling magnetic recording medium is formed by said first and second core elements, said metal thin film on said first core element defining a first notch with said first planar surface of said second core element, and said metal thin film on said second core element defining a second notch with said first planar surface of said first core element, said first and second notches being filled with non-magnetic material and defining the width of said operating magnetic gap.

2. A magnetic transducer head for cooperating with a recording or reproducing track on a magnetic medium comprising:
   as first magnetic core element, and a second magnetic core element,
   each of said first and second core elements comprising a magnetic ferrite block, a magnetic metal thin film integrated with said magnetic ferrite block,
   each of said core elements having a first planar surface and a second planar surface portion adjacent to said first planar surface,
   said magnetic metal thin film on said first core element being provided on said second planar surface portion of said first core element and facing an edge thereof to said first planar surface of said first core element, said second planar surface portion of said first core element being slanted with respect to said first planar surface of said first core element,
   said magnetic metal thin film on said second core element being provided on said second planar surface portion of said second core element and facing an edge thereof to said first planar surface of said second core element, said second planar surface portion of said second core element being slanted with respect to said first planar surface of said second core element, said first and second core elements being bonded together along a bonding plane parallel to their said first surfaces, in such manner that an operating magnetic gap is formed between said edge of said magnetic metal thin film on said first core element and said edge of said magnetic metal thin film on said second core element, said track extending across said magnetic gap in a direction transverse to said bonding plane, said magnetic metal thin film on said first core element and said magnetic thin film on said second core element are in one common plane and forming a track width of said operating magnetic gap larger than the thickness of said magnetic metal thin film, and a common contact surface facing a travelling magnetic recording medium is formed by said first and second core elements, said metal thin film on said first core element defining a first notch with said first planar surface of said second core element, and said metal thin film on said second core element defining a second notch with said first planar surface of said first core element, said first and second notches being filled with non-magnetic material and defining the width of said operating magnetic gap, and a non-magnetic thin film having a hardness greater than the hardness of said magnetic film, interposed between said magnetic metal thin film and said non-magnetic material filling in said first notch.

3. A magnetic transducer head for cooperating with a recording or reproducing track on a magnetic medium comprising:

a first magnetic core element, and a second magnetic core element, each of said first and second core elements comprising a magnetic ferrite block, a magnetic metal thin film integrated with said magnetic ferrite block, and a non-magnetic thin film having a hardness greater than the hardness of said magnetic film, interposed between said magnetic ferrite block and said metal thin film, each of said core elements having a first planar surface and a second planar surface portion adjacent to said first planar surface, said magnetic metal thin film on said first core element being provided on said second planar surface portion of said first core element and facing an edge thereof to said first planar surface of said first core element, said second planar surface portion of said first core element being slanted with respect to said first planar surface of said first core element, said magnetic metal thin film on said second core element being provided on said second planar surface portion of said second core element and facing an edge thereof to said first planar surface of said second core element, said second planar surface portion of said second core element being slanted with respect to said first planar surface of said second core element, said first and second core elements being bonded together along a bonding plane parallel to their said first surfaces, in such manner that an operating magnetic gap is formed between said edge of said magnetic metal thin film on said first core element and said edge of said magnetic metal thin film on said second core element, said track extending across said magnetic gap in a direction transverse to said bonding plane, said magnetic metal thin film on said first core element and said magnetic thin film on said second core element are in one common plane and forming a track width of said operating magnetic gap larger than the thickness of said magnetic metal thin film, and a common contact surface facing a travelling magnetic recording medium is formed by said first and second core elements, said metal thin film on said first core element defining a first notch with said first planar surface of said second core element, and said metal thin film on said second core element defining a second notch with said first planar surface of said first core element, said first and second notches being filled with non-magnetic material and defining the width of said operating magnetic gap, and a non-magnetic thin film interposed between said magnetic metal thin film and said non-magnetic material filling in said first notch.

4. A magnetic transducer head according to claims 1, 2 or 3, wherein said operating magnetic gap is provided at the central 5. A magnetic transducer head according to claims 1, 2 or 3, wherein an angle between said first planar surface and said second surface as viewed from said contact surface is between 20°, and 80°.

6. A magnetic transducer head according to claims 1, 2 or 3,, further comprises an opening for winding coil provided on at least one of said core elements facing to said first planar surface, dividing said operating magnetic gap and a back gap, and a coil wound through said opening.

7. A magnetic transducer head according to claim 6, wherein said magnetic metal thin film is provided to extend to said back gap.

8. A magnetic transducer head according to claim 6, wherein said back gap is formed between each of said ferrite blocks of said core element.

9. A magnetic transducer head according to claims 1, 2 or 3, wherein said magnetic metal thin film has substantially uniform columnar structure over entire area of said magnetic metal 10. A magnetic transducer head according to claims 1, 2 or 3, wherein said magnetic metal thin film is crystalline alloy.

11. A magnetic transducer head according to claims 1, 2 or 3, therein said magnetic metal thin film is Fe - Al - Si alloys.

12. A magnetic transducer head according to claims 1, 2 or 3, wherein said magnetic metal thin film has substantially uniform characteristics of magnetic anisotropy over entire area of said magnetic metal thin film.

13. A magnetic transducer head according to claims 1, 2 or 3, wherein said magnetic metal thin film is amorphous alloy.

14. A magnetic transducer head according to claims 1, 2 or 3, wherein said magnetic metal thin film is metal-metalloid amorphous alloys.

15. A magnetic transducer head according to claims 1, 2 or 3, wherein said magnetic metal thin film is metal-metal amorphous alloys.

16. A magnetic transducer head according to claims 1 to 15, wherein a thickness of said non-magnetic film between 50 Å and 2000 Å.

17. A magnetic transducer head according to claims 1 or 6, wherein said non-magnetic film is non-magnetic oxide or non-magnetic metal or alloy thereof.

18. A magnetic transducer head according to claim 17, wherein said non-magnetic oxide is selected from the group consisting of $SiO_2$, $TiO_2$, $Ta_2O_5$, $Al_2O_3$, $Cr_2O_3$, glass having high melting point.

19. A magnetic transducer head according to claim 17, wherein said non-magnetic metal or alloy thereof is selected from the group consisting of Cr, Ti, Si.

20. A magnetic transducer head for cooperating with a recording or reproducing track on a magnetic medium comprising:
- a first and second magnetic core element bonded together having an operating magnetic gap between first planar surfaces of each of said magnetic core elements, and a contact surface for a travelling magnetic recording medium, said track extending across said magnetic gap in a direction transverse to the bonding surface between said first and second magnetic core elements;
- each of aid magnetic core elements having a third surface extending adjacent to said first planar surface and contact surface;
- said core element comprising a magnetic ferrite block having a second planar surface extending from said first planar surface to a side of said third surface;
- a magnetic metal thin film formed of said second planar surface extending from said first planar surface to said side of said third surface along a line not perpendicular to said magnetic gap as viewed on said contact surface;
- a non-magnetic material portion extending to said first planar surface, said contact surface and said third surface; and a non-magnetic film having a hardness greater than the hardness of said magnetic thin film, interposed between said magnetic metal thin film and said non-magnetic material portion;
- said first and second core elements being bonded together in such manner that an operating magnetic gap is formed between said edges of said magnetic metal thin film appearing on said first planar surface of each said core elements, and said line of said first core element and said second core element exist on a common straight line as viewed on said contact surface.

21. A magnetic transducer head according to claim 20, wherein said operating magnetic gap is provided at the central portion of said contact surface.

22. A magnetic transducer head according to claim 20, wherein an angle between said first, planar surface and said second planar surface as viewed from said contact surface is between 20° and 80°.

23. A magnetic transducer head according to claim 20, further comprises an opening for winding coil provided on at least one of said core elements facing to said first planar surface, dividing said operating magnetic gap and a back gap, and a coil wound through said opening.

24. A magnetic transducer head according to claim 23, wherein said magnetic metal thin film is provided to extend to said back gap.

25. A magnetic transducer head according to claim 23, wherein said back gap is formed between each of said ferrite blocks of said core element.

26. A magnetic transducer head according to claim 20, wherein said magnetic metal thin film has substantially uniform columnar structure over entire area of said magnetic metal thin film.

27. A magnetic transducer head according to claim 20, wherein said magnetic metal thin film is crystalline alloy.

28. A magnetic transducer head according to claim 20, wherein said magnetic metal thin film is Fe - Al - Si alloys.

29. A magnetic transducer head according to claim 20, wherein said magnetic metal thin film has substantially uniform characteristics of magnetic anisotropy over entire area of said magnetic metal thin film.

30. A magnetic transducer head according to claim 20, wherein said magnetic metal thin film is amorphous alloy.

31. A magnetic transducer head according to claim 20, wherein said magnetic metal thin film is metal-metalloid amorphous alloys.

32. A magnetic transducer head according to claim 20, wherein said magnetic metal thin film is metal-metal amorphous alloys.

33. A magnetic transducer head according to claims 20 to 32, wherein said non-magnetic film is non-magnetic oxide or non-magnetic metal or alloy thereof or metal having high melting point or oxide thereof.

34. A magnetic transducer head according to claim 33, wherein said non-magnetic oxide is selected from the group consisting of $SiO_2$, $TiO_2$, $Ta_2O_5$, $Al_2O_3$, $Cr_2O_3$, glass having high melting point.

35. A magnetic transducer head according to claim 33, wherein said non-magnetic metal or alloy thereof is selected from the group consisting of Cr, Ti, Si.

36. A magnetic transducer head according to claim 33, wherein said metal having high melting point or oxide thereof is selected from the group consisting of W, Mo, Ta.

37. A magnetic transducer head for cooperating with a recording or reproducing track on a magnetic medium comprising:
- a first and second magnetic core element bonded together having an operating magnetic gap between first planar surfaces of each of said magnetic core elements, and a contact surface for a travelling magnetic recording medium, said track extending across said magnetic gap in a direction transverse to the bonding surface between said first and second magnetic core elements;
- each of said magnetic core elements having a third surface extending adjacent to said first planar surface and contact surface;
- said core element comprising a magnetic ferrite block having a second planar surface extending from said first planar surface to a side of said third surface;
- a magnetic metal thin film formed of said second planar surface extending from said first planar surface to said side of said third surface along a line not perpendicular to said magnetic gap as viewed on said contact surface;
- a non-magnetic material portion extending to said first planar surface, said contact surface and said third surface;
- a first non-magnetic film having a hardness greater than the hardness of said magnetic thin film interposed between said magnetic ferrite block and said magnetic metal thin film; and
- a second non-magnetic film having a hardness greater than the hardness of said magnetic thin film interposed between said magnetic metal thin film and said non-magnetic material portion;

said first and second core elements being bonded together in such manner that an operating magnetic gap is formed between said edges of said magnetic metal thin film appearing on said first planar surface of each said core elements, and said line of said first core element and said second core element exist on a common straight line as viewed on said contact surface.

38. A magnetic transducer head according to claim 37, wherein said operating magnetic gap is provided at the central portion of said contact surface.

39. A magnetic transducer head according to claim 37, wherein an angle between said first planar surface and said second planar surface as viewed from contact surface is between 20° and 80°.

40. A magnetic transducer head according to claim 37, further comprises an opening for winding coil provided on at least one of said core elements facing to said first planar surface, dividing said operating magnetic gap and a back gap, and a coil wound through said opening.

41. A magnetic transducer head according to claim 37, wherein said magnetic metal thin film is provided to extend to said back gap.

42. A magnetic transducer head according to claim 37, wherein said back gap is formed between each of said ferrite blocks of said core element.

43. A magnetic transducer head according to claim 37, wherein said magnetic metal thin film has substantially uniform columnar structure over entire area of said magnetic metal thin film.

44. A magnetic transducer head according to claim 37, wherein said magnetic metal thin film is crystalline alloy.

45. A magnetic transducer head according to claim 37, wherein said magnetic metal thin film is Fe - Al - Si alloys.

46. A magnetic transducer head according to claim 37, wherein said magnetic metal thin film has substantially uniform characteristics of magnetic anisotropy over entire area of said magnetic metal thin film.

47. A magnetic transducer head according to claim 37, wherein said magnetic metal thin film is amorphous alloy.

48. A magnetic transducer head according to claim 37, wherein said magnetic metal thin film is metal-metalloid amorphous alloys.

49. A magnetic transducer head according to claim 37, wherein said magnetic metal thin film is metal-metal amorphous alloys.

50. A magnetic transducer head according to claim 37 to 49, wherein a thickness of said first non-magnetic film is between 50 Å and 2000 Å.

51. A magnetic transducer head according to claims 37 to 49, wherein said first non-magnetic film is non-magnetic oxide or non-magnetic metal or alloy thereof.

52. A magnetic transducer head according to claim 51, wherein said non-magnetic oxide is selected from the group consisting of $SiO_2$, $TiO_2$, $Ta_2O_5$, $Al_2O_3$, $Cr_2O_3$, glass having high melting point.

53. A magnetic transducer head according to claim 51, wherein said non-magnetic metal of alloy thereof is selected from the group consisting of Cr, Ti, Si.

54. A magnetic transducer head according to claim 37 to 49, wherein said second non-magnetic film is non-magnetic oxide or non-magnetic metal or alloy thereof or metal having high melting point of oxide thereof.

55. A magnetic transducer head according to claim 54, wherein said non-magnetic oxide is selected from the group consisting of $SiO_2$, $TiO_2$, $Ta_2O_5$, $Al_2O_3$, $Cr_2O_3$, glass having high melting point.

56. A magnetic transducer head according to claim 54, wherein said non-magnetic metal or alloy thereof is selected from the group consisting of Cr, T, Si.

57. A magnetic transducer head according to claim 54, wherein said metal having high melting point or oxide thereof is selected from the group consisting of W, Mo, Ta.

58. A magnetic transducer head according to claims 20 or 37, further comprises cut out portions formed on each of said core elements extending to said first planar surface, said contact surface and a surface opposite to said third surface.

* * * * *